United States Patent
Bass et al.

(10) Patent No.: US 6,642,183 B1
(45) Date of Patent: Nov. 4, 2003

(54) LUBRICATING METHOD FOR SILICATE DRILLING FLUIDS

(75) Inventors: Jonathan L. Bass, Audybon, PA (US); Michael J. McDonald, Toronto (CA); John C. Urquhart, Hopeman (GB)

(73) Assignee: National Silicates Partnership, Ontario (CA)

( * ) Notice: Subject to any disclaimer, the term of this patent is extended or adjusted under 35 U.S.C. 154(b) by 0 days.

(21) Appl. No.: 09/720,510

(22) PCT Filed: Jun. 25, 1999

(86) PCT No.: PCT/CA99/00596

§ 371 (c)(1), (2), (4) Date: Jun. 4, 2001

(87) PCT Pub. No.: WO00/00569

PCT Pub. Date: Jan. 6, 2000

(30) Foreign Application Priority Data

Jun. 26, 1998 (CA) .............................................. 2241621

(51) Int. Cl.[7] .................................................. C09K 7/02
(52) U.S. Cl. .................... 507/129; 507/140; 507/141; 507/145
(58) Field of Search .................. 507/140, 141, 507/145, 129

(56) References Cited

U.S. PATENT DOCUMENTS

| | | | |
|---|---|---|---|
| 2,133,759 A | | 10/1938 | Vail et al. |
| 3,640,343 A | * | 2/1972 | Darley .......................... 507/145 |
| 3,679,001 A | * | 7/1972 | Hill .............................. 507/145 |
| 3,746,109 A | * | 7/1973 | Darley .......................... 507/145 |
| 4,637,883 A | | 1/1987 | Patel et al. |
| 5,209,297 A | * | 5/1993 | Ott ............................... 507/140 |
| 5,380,706 A | | 1/1995 | Himes et al. |
| 5,401,719 A | * | 3/1995 | DeBeer ......................... 507/140 |
| 5,826,669 A | * | 10/1998 | Zaleski et al. ................ 507/140 |
| 6,248,698 B1 | * | 6/2001 | Mullen et al. ................ 507/140 |
| 6,258,756 B1 | * | 7/2001 | Hayatdavoudi .............. 507/145 |

FOREIGN PATENT DOCUMENTS

| | | |
|---|---|---|
| EP | 0 390 387 A1 | 10/1990 |
| EP | 0545 677 | 9/1993 |
| GB | 949 058 | 2/1964 |

* cited by examiner

*Primary Examiner*—Philip Tucker
(74) *Attorney, Agent, or Firm*—Townsend and Townsend and Crew LLP

(57) ABSTRACT

Improved silicate drilling fluids are produced by the addition of tetra alkyl ammonium compounds, in particular tetra methyl ammonium hydroxide to silicate drilling fluid mud to lower the co-efficient of friction between drill string and wellbore. It has also been discovered that the same tetra alkyl ammonium lubricant compounds greatly lessen the viscosity breakdown of swelled hectorite clay in the presence of silicate. This allows the preparation of silicate drilling fluids not only with enhanced lubricity but having stable rheology at the higher temperature and pressures encountered in some drilling operations.

8 Claims, 1 Drawing Sheet

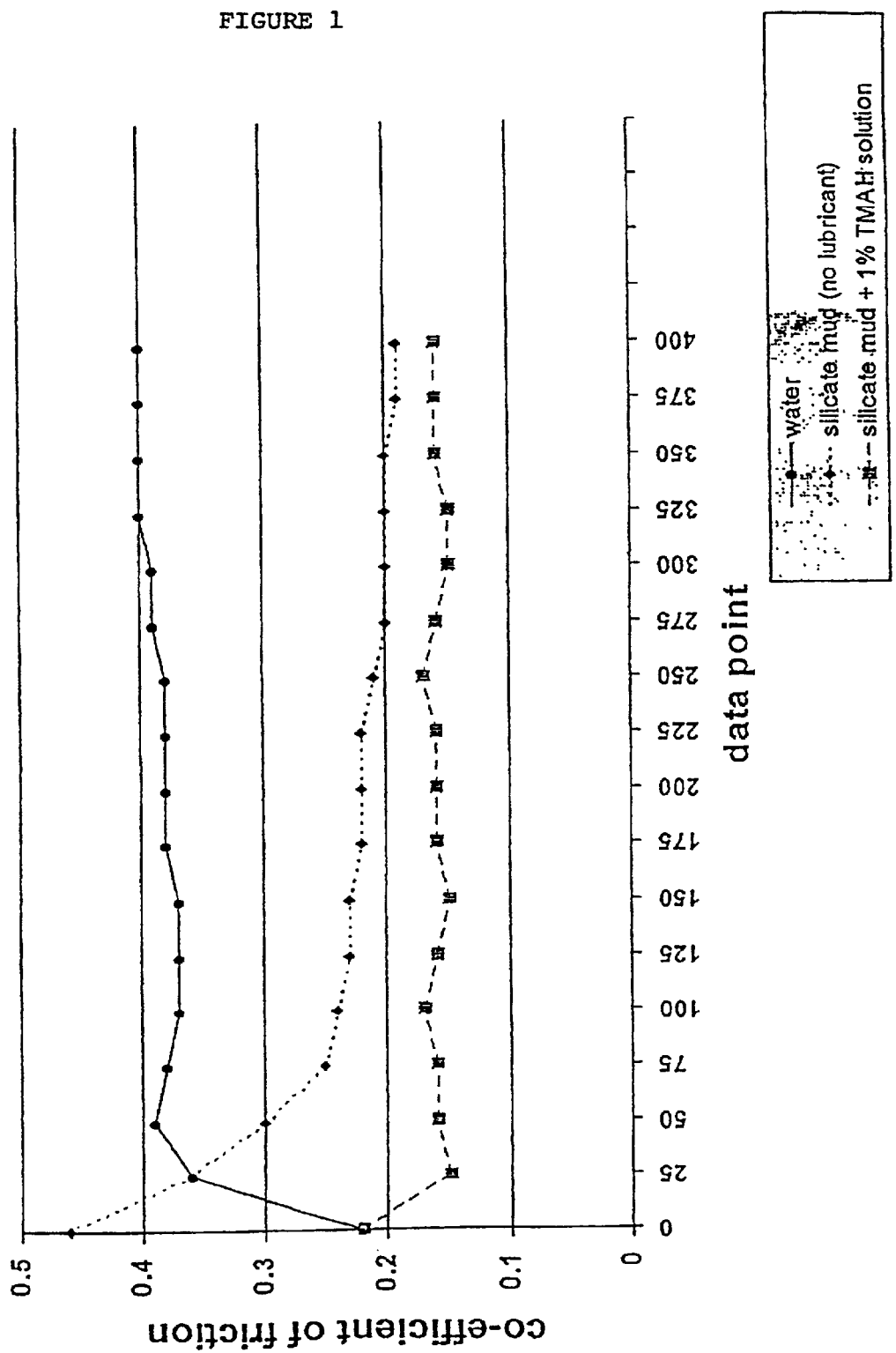

LUBRICATING METHOD FOR SILICATE DRILLING FLUIDS

BACKGROUND OF THE INVENTION

This invention relates to novel silicate based drilling fluids to be used primarily in well drilling for oil and gas. In particular this invention concerns the formulation of a silicate based drilling fluid that provides greater lubrication during drilling and can be used as a high pressure and high temperature rheology agent.

The use of silicate as a drilling fluid component is well established. Silicate has been used since the 1930s as an effective means of stabilizing shale formations. Despite being an effective shale stabilizer, silicate never achieved early, widespread success, owing to certain advantages held by oil based drilling fluids. Oil based drilling fluids offer ease of use, are not prone to gellation or precipitation and provide good lubrication between the drill string and well bore, as measured by coefficients of friction in the range of 0.10 to 0.18 compared with a range of 0.18 to 0.22 for water-based fluids. Until recent environmental pressures there was little incentive to improve the performance deficiencies in silicate-containing, water-based drilling fluids.

An early example of the use of silicate in the water-based drilling fluid is afforded by U.S. Pat. No. 2,133,759 in which the shale inhibition characteristics of silicate are described.

Elsewhere in the prior art, there is discussed the use of alkyl ammonium in compounds in drilling fluids for enhancing performance. In particular, U.S. Pat. No. 4,637,883 discusses the reaction of quebracho tannin with alkyl quaternary ammonium salts in an oil-based drilling fluid. The function of the alkyl quaternary ammonium salt-quebracho complex is to act as a high-temperature, high-pressure fluid loss additive in an oil-based drilling fluid.

European Patent EP-A-0 445 677 (equivalent to U.S. Pat. No. 5,380,706) describes a quaternary ammonium compound used for shale inhibition in a water-based drilling fluid. European Patent EP-A-0 390 387 describes the use of tetra alkyl ammonium compounds in the formulation of a hydraulic fracturing fluid, where they prevent the adsorption of clay onto polysaccharides. British Patent Publication GB-A-949058 describes the use of an oil-based fracturing fluid in which surface active agents are employed, including tertiary amines, to disperse oil-insoluble solids.

The first aspect of this invention deals with improving the lubricating properties of silicate by the addition of a lubricant which remains effective in highly alkaline silicate media. Good lubrication is necessary in order to avoid slower drilling rates, differential sticking, higher torque, fatigue on the drill string and possible hole loss. These problems become more acute with increases in well hole length and/or the hole angle.

We have discovered that the addition of certain tetra alkyl ammonium compounds, in particular tetra (lower alkyl) ammonium hydroxide, to silicate or silicate drilling fluid mud can lower the co-efficient of friction between the drill string and well bore. As well as meeting lubricant requirements, tetra alkyl ammonium compounds are environmentally safe, compatible with other drilling additives and temperature and time stable.

The second aspect of this invention deals with imparting stable high pressure and high temperature (HPHT) rheology to a silicate drilling fluid. The rheology of a drilling fluid is a critical factor governing such drilling characteristics as removal of drill cuttings, stabilization of the rock formation, ease of pumping, control of fluid loss and drill string support. It is critical that a desirable rheology be maintained during the full range of temperatures encountered during the drilling procedure. Maintenance of rheology becomes increasingly difficult as higher temperatures are encountered downhole.

Although silicate itself is stable at HPHT, the viscosity increasing organic polymeric additives typically used to impart rheological properties and to control fluid loss are by themselves subject to breakdown at HPHT. We have discovered that the combination of the aforementioned tetra alkyl ammonium compounds with silicate and, additionally, a hectorite clay, results in a useful, HPHT-stable rheology for drilling. It is believed that other applications in which control of rheology is important, such as coatings and adhesives, might well benefit from the discovery of this synergic enhancement of properties, quite apart from the specific present application of rheology agents for drilling fluids.

Swelling clays such as bentonite are used extensively in the drilling fluid industry as rheology agents. As well as providing a useful rheology, swelling clays are resistant to HPHT. Swelling clays had not been used with silicate-based drilling fluids, however, because the addition of a small amount of silicate to a swelled clay often results in total loss of viscosity of the swelled clay. That loss of viscosity or rheological properties is due to the dispersion effect silicate has on clay platelets.

Swelled hectorite clay, on the other hand, apparently can retain partial viscosity after the addition of silicate, with the loss of viscosity in a swelled hectorite clay proportional to the amount of silicate added. We have discovered that inclusion of a tetra alkyl ammonium compound reduces the dispersion effect of silicate has on the swelled hectorite, thus allowing for a greater range of formulating hectorite with silicate in drilling fluids.

A further advantageous effect of the addition of tetra alkyl ammonium hydroxide to silicate-based drilling fluids containing hectorite clays is that the resulting modification to the rheology and the silicate/clay mud produces a drilling fluid more comparable in behavior, in low- to medium-pressure and temperature wells, to conventional organic gum systems which are subject to decomposition at HPHT.

SUMMARY OF THE INVENTION

With a view to providing a silicate-based drilling fluid exhibiting good lubricity in oil- and gas-drilling applications, there is provided a silicate drilling fluid comprising 50 to 94.9 volume percent water; 5 to 50 volume percent liquid sodium silicate and 0.1 to 15 volume percent of liquid tetra alkyl ammonium compounds. The drilling fluid may also include high molecular weight polymers for improving rheological properties or decreasing fluid loss. Hectorite clay may be added as a viscosifying agent and other useful materials may be added to the water-based silicate drilling fluid according to the invention.

As is conventional in the art, herein "liquid sodium silicate" refers to aqueous silicate solutions prepared at the usual commercial concentrations ranging from about 37 weight percent to 45 weight percent of silicate in water. Likewise, "liquid tetra-alkyl ammonium hydroxide" refers to commercially available solutions in which the ammonium compound is present at about 25% by weight in the aqueous solution.

The preferred tetra alkyl ammonium compound is ammonium hydroxide tetra substituted with lower alkyl (methyl to butyl) groups. The currently preferred compound is tetramethylammonium hydroxide (TMAH).

Silicates useful in carrying out the present invention include materials in solution as well as hydrated solids and anhydrous silicates exhibiting molar ratios of $SiO_2:Na_2O$ (and/or $K_2O$) in the range of 1.5 to 4.0. A particular silicate which has been found useful in silicate-based drilling fluids according to the present invention is D Sodium Silicate (trademark) manufactured by the PQ Corporation (Valley Forge, Penn.). D® Sodium Silicate exhibits a weight ratio of $SiO2:Na_2O$ of about 2.0, and a silicate concentration of 45 percent by weight in aqueous solution.

It is preferred to prepare silicate-based drilling fluids according to the present invention by adding the TMAH lubricant to the silicate mud, i.e., to the pre-mixed water/silicate. In that way, the higher levels of lubricant in the silicate drilling fluid can be achieved, compared with the procedure of pre-mixing the lubricant with silicate before adding the water. TMAH and other tetra alkyl ammonium compound lubricants of the kind comprehended in the present invention are not as soluble in liquid silicate as in a water-diluted silicate drilling fluid. Nevertheless, we have discovered that the lubricant is effective at low concentrations.

With a view to formulating a silicate mud having a stable rheology at high pressure and high temperature, there is added to a silicate-based drilling fluid continuing the tetra alkyl ammonium compound lubricants, a suitable amount of a hectorite clay. To provide HPHT rheology, we have found that hectorite clay in the amount of 1–10 percent ppv should be included in the final formulation.

BRIEF DESCRIPTION OF THE DRAWING

The single drawing, FIG. 1, is a graphic presentation of data comparing the coefficient of metal-metal friction for different drilling fluids.

DETAILED DESCRIPTION OF PREFERRED EMBODIMENTS

In the experimental examples given below, the silicate used in formulating silicate drilling fluids according to the present invention is D® Silicate manufactured by PQ Corporation. TMAH and tetrabutylammonium hydroxide (TBAH) were obtained as 25 percent aqueous solutions manufactured by Sachem (Cleburne, Tex.).

"Hectorite clay" refers to a subset of the smectite or swelling clays, differing from the others in being composed primarily of sodium magnesium lithium silicate and in exhibiting a smaller platelet size. A form of hectorite which has been found particularly useful in Bentone EW (trademark) manufactured by the Rheox Corporation (Highstown, N.J.).

Following the standard used in the drilling industry, liquid components such as water or silicate are measure by volume. Solid material such as rheology agents are measured by weight. The 25% dissolved solution of TMAH was used during testing. TMAH levels are reported on a "as used" basis.

EXAMPLE 1

Example #1 illustrates the drop in coefficient of friction (i.e., enhanced lubricity) achieved with a lubricant (TMAH or TBAH) has been post-added to a silicate drilling fluid.

The silicate drilling fluid was prepared according to the illustrated formulation and served as a control and a base fluid for the addition of the lubricant. All compositions in this example were manufactured by first metering-in the viscosity-increasing rheology agents (xantham gum and polyanionic cellulose) into water under moderate agitation. Sufficient time was allowed for the rheology agent to develop viscosity. The next was either adding the silicate followed by the lubricant or adding silicate/lubricant that had been pre-blended. Lubricity was measured using a Baroid™ Combination EP (extreme pressure) and lubricity test meter. The control formulation consisted of:

1. 70 pbv water
2. 0.43 pbw xantham gum (Kelzan XCD)
3. 0.43 pbw polyanionic cellulose (Staflo Exlo Supreme)
4. 30 pbv sodium silicate (D®)

Lubricants evaluated were tetramethyammonium hydroxide TMAH (25% solution in water) and tetrabutylammonium hydroxide TBAH (25% solution in water)

TABLE 1

Lubricity Results

| Formulation | lubricant post added (pbv to pbv silicate) | co-efficient of friction |
| --- | --- | --- |
| Water | 0 | 0.340 |
| Control | 0 | 0.391 |
| Control | 0.5% TMAH | 0.342 |
| Control | 1.0% TMAH | 0.301 |
| Control | 5.0% TMAH | 0.305 |
| Control | 10.0% TMAH | 0.307 |
| Control | 5.0% TBAH | 0.341 |

The addition of 1.0 percent TMAH to the control silicate-base fluid reduced the coefficient by 23 percent.

EXAMPLE 2

In the formulation tested, lubricant was pre-added to the silicate and then formulated to make a silicate drilling fluid. Lubricity testing was switched to an HLT Lubricity Tester. The HLT lubricity tester consists of a metal test bob 3 inches in length and 2.5 inches in diameter. The bob is rotated in a metal pipe with the drilling fluid that is being tested being circulated at a constant flow rate. It was believed that this test protocol better matched conditions that would be met during drilling.

Formula
1. 70 pbv water
2. 0.43 pbw xantham gum (Kelzan XCD
3. 0.43 pbw polyanionic cellulose (Staflo Exlo Supreme)
4. 30 pbv D® silicate premixed (a) 1.0% pbv TMAH to silicate; or
5. 5.0% pbv TMAH to silicate Table 2 shows the reduction of the average co-efficient of friction while FIG. 1 shows the initial co-efficient of friction and the rate of decrease to the average co-efficient of friction. The initial friction and rate of friction drop are critical since these have a direct bearing on torque requirements and metal strength.

TABLE #2

| Formulation | Amount TMAH present (pbv TMAH to pbv silicate) | Average co-efficient of friction |
| --- | --- | --- |
| Water | 0 | 0.39 |
| Control from example #1 | 0 | 0.23 |
| Example #2a | 1.0% TMAH | 0.16 |
| Example #2b | 5.0% TMAH | 0.15 |

EXAMPLE #3

In this example, the Theological properties of various combinations of water, hectorite clay (Bentone EW), Silicate D and TMAH (25 percent aqueous solution) are presented in Table 3a.

The data illustrate the thinning effect which added silicate has on swelled hectorite in water and the offsetting thickening effect when TMAH is mixed into the silicate prior to the addition of the silicate to swelled hectorite in water. TMAH was seen to have a thinning effect when silicate was not present. There was an observed tendency of all of the fluids to increase in viscosity after hot rolling, which is believed to be the result of better setting of the hectorite clay with time, agitation and heat.

Rheology measurements were made using an OFI 8-speed Model 100 viscometer, with all rheology measurements taken at 120° F., following API recommended practice (Guide 13B-1, section 2). Rheology testing was carried out both before and after hot roll aging. Hot roll aging was carried out at 300° F. for 16 hours, in accordance with the recommended practices of API Manual 13I, section 19.

By way of comparison, the rheology profile of the control of Example No. 1, supra, is shown in Table 3b below.

In practice, in formulating drilling fluids for use in the field, the independent variable will be the silicate loading. Thus, in Examples 1 to 3, the silicate loading is 30 percent. Rheology measurements can then be carried out varying the dependent variables of the relative amounts added of tetra alkyl hydroxide lubricant compounds and hectorite clay, to optimize the Theological behavior. In Example No. 5 discussed below, a silicate loading level of 15 percent is used in the drilling fluid formulations tested.

TABLE #3a

| | Hectorite Formulations | | | |
|---|---|---|---|---|
| | 1 | 2 | 3 | 4 |
| Water | 1000 pbv | 1000 pbv | 700 pbv | 700 pbv |
| Bentone ® EW | 40 pbw | 40 pbw | 40 pbw | 40 pbw |
| D ® silicate | 0 | 0 | 300 pbv | 300 pbv |
| TMAH (25%) | 0 | 3 pbv | 0 | 3 pbv |
| Rheology prior to Hot Rolling | | | | |
| 600 rpm | 103 | 94 | 34 | 125 |
| 300 rpm | 83 | 69 | 20 | 125 |
| 200 rpm | 60 | 54 | 15 | 124 |
| 100 rpm | 46 | 40 | 10 | 91 |
| 6 rpm | 21 | 15 | 5 | 51 |
| 3 rpm | 16 | 12 | 5 | 48 |
| 10 s gel | 18 | 15 | 5 | 48 |
| 10 min gel | 26 | 25 | 5 | 54 |
| Rheology After Hot Rolling for 16 hrs @ 300° F. | | | | |
| 600 rpm | 158 | 100 | 40 | 225 |
| 300 rpm | 152 | 82 | 22 | 211 |
| 200 rpm | 140 | 78 | 16 | 198 |
| 100 rpm | 131 | 72 | 10 | 184 |
| 6 rpm | 108 | 60 | 5 | 97 |
| 3 rpm | 96 | 47 | 5 | 85 |

TABLE #3a-continued

| | Hectorite Formulations | | | |
|---|---|---|---|---|
| | 1 | 2 | 3 | 4 |
| 10 s gel | 78 | 44 | 5 | 78 |
| 10 min gel | 82 | 48 | 5 | 75 |

TABLE 3b

| | Rheology profile of example #1, control | | | | | | | |
|---|---|---|---|---|---|---|---|---|
| | 600 rpm | 300 rpm | 200 rpm | 100 rpm | 6 rpm | 3 rpm | 10 s gel | 10 min gel |
| Not hot rolled | 60 | 42 | 35 | 25 | 9 | 6 | 8 | 12 |
| Hot rolled | 8 | 4 | 2 | 1 | 0 | 0 | 0 | 0 |

EXAMPLE 4

This example illustrates the interaction of hectorite (Bentone® EW) and TMAH (25% aqueous solution) at silicate (D®) fixed at 30% pbv. The silicate concentration was set at 30% pbv because this was believed to be a level of silicate that would be both highly inhibitive of shale and stable from possible problems associated with acidic gases and multivalent cation contamination coming from the bore hole.

A central composite experimental design was used to characterize the interaction of hectorite (Bentone® EW) and TMAH (25% aqueous solution) at silicate (D®) fixed at 30% pbv. The TMAH was mixed with the silicate prior to adding the silicate/TMAH to the swelled hectorite clay. The factors for the central composite design were set such that the rheology response would provide a range of results that could be deemed useful for drilling fluids. For those familiar with central composite experimental designs, the factors are shown in Table 4a.

TABLE 4a

| | Experimental Variables | |
|---|---|---|
| Factor | − | + |
| Bentone ® EW | 2.5% pbw | 3.5% pbw |
| TMAH (25% solution) | 1.0% pbv to silicate | 2.0% pbv to silicate |

TABLE 4b

| | Formulations vs. Rheology | | | | | | | | | | | |
|---|---|---|---|---|---|---|---|---|---|---|---|---|
| | #1 | #2 | #3 | #4 | #5 | #6 | #7 | #8 | #9 | #10 | #11 | #12 |
| FORMULATIONS | | | | | | | | | | | | |
| Water | 700 ml | 700 ml | 700 ml | 700 ml | 700 ml | 700 ml | 700 ml | 700 ml | 700 ml | 700 ml | 700 ml | 700 ml |
| Bentone ® EW | 25 g | 35 g | 25 g | 35 g | 2.29 g | 37.1 g | 30 g | 30 g | 30 g | 30 g | 30 g | 30 g |
| D ® silicate | 300 ml | 300 ml | 300 ml | 300 ml | 300 ml | 300 ml | 300 ml | 300 ml | 300 ml | 300 ml | 300 ml | 300 ml |
| TMAH* | 3 ml | 3 ml | 6 ml | 6 ml | 4.5 ml | 4.5 ml | 2.37 ml | 6.63 ml | 4.5 ml | 4.5 ml | 4.5 ml | 4.5 ml |

TABLE 4b-continued

Formulations vs. Rheology

| | #1 | #2 | #3 | #4 | #5 | #6 | #7 | #8 | #9 | #10 | #11 | #12 |
|---|---|---|---|---|---|---|---|---|---|---|---|---|
| PRIOR TO HOT ROLLING | | | | | | | | | | | | |
| 600 rpm | 54 | 120 | 54 | 63 | 46 | 105 | 60 | 63 | 58 | 60 | 62 | 58 |
| 300 | 36 | 112 | 33 | 40 | 28 | 103 | 53 | 35 | 51 | 55 | 51 | 38 |
| 200 | 26 | 110 | 23 | 34 | 20 | 82 | 40 | 26 | 41 | 48 | 40 | 32 |
| 100 | 17 | 110 | 11 | 25 | 15 | 69 | 34 | 16 | 35 | 42 | 30 | 28 |
| 6 | 8 | 55 | 3 | 10 | 5 | 30 | 16 | 5 | 16 | 25 | 13 | 12 |
| 3 | 5 | 41 | 2 | 7 | 3 | 30 | 10 | 4 | 10 | 16 | 8 | 9 |
| 10 s gel | 7 | 44 | 3 | 8 | 5 | 31 | 11 | 5 | 10 | 12 | 8 | 10 |
| 10 min gel | 7 | 59 | 3 | 9 | 5 | 28 | 11 | 5 | 11 | 12 | 6 | 10 |
| AFTER HOT ROLLING 16 HRS @ 300° F. | | | | | | | | | | | | |
| 600 rpm | 58 | 90 | 50 | 67 | 44 | 70 | 63 | 46 | 59 | 57 | 65 | 50 |
| 300 | 33 | 84 | 29 | 48 | 26 | 66 | 58 | 28 | 54 | 52 | 52 | 31 |
| 200 | 29 | 82 | 22 | 39 | 19 | 59 | 49 | 20 | 41 | 45 | 42 | 28 |
| 100 | 21 | 81 | 12 | 28 | 14 | 53 | 41 | 11 | 34 | 38 | 32 | 22 |
| 6 | 6 | 44 | 5 | 12 | 5 | 25 | 19 | 4 | 17 | 20 | 13 | 12 |
| 3 | 4 | 36 | 4 | 10 | 3 | 17 | 12 | 2 | 10 | 11 | 8 | 8 |
| 10 s gel | 5 | 38 | 4 | 10 | 4 | 22 | 15 | 3 | 10 | 12 | 9 | 9 |
| 10 s min | 6 | 40 | 4 | 11 | 4 | 23 | 15 | 3 | 10 | 13 | 10 | 10 |

EXAMPLE #5

This example illustrates the effect of increasing the TMAH dosage from 0 (column no. 1) in stages up to 0.35 percent ppv (column no. 4) In the formations given in this example, the TMAH has been post-added to a silicate/hectorite drilling fluid (silicate loading 15 percent).

TABLE 5

Formulations vs. Rheology

| | #1 | #2 | #3 | #4 |
|---|---|---|---|---|
| FORMULATIONS | | | | |
| Water | 850 ml | 850 ml | 850 ml | 850 ml |
| Bentone ® EW | 40 g | 40 g | 40 g | 40 g |
| D ® silicate | 150 ml | 150 ml | 150 ml | 150 ml |
| TMAH* | 0 | 1.5 ml | 2.63 ml | 3.75 ml |
| PRIOR TO HOT ROLLING | | | | |
| 600 rpm | 29 | 55 | 102 | 133 |
| 300 | 23 | 42 | 83 | 135 |
| 200 | 19 | 36 | 62 | 148 |
| 100 | 17 | 26 | 50 | 146 |
| 6 | 12 | 11 | 36 | 85 |
| 3 | 8 | 9 | 33 | 66 |
| 10 s gel | 8 | 10 | 25 | 60 |
| 10 min gel | 10 | 19 | 36 | 64 |
| AFTER HOT ROLLING FOR 16 HRS AT 300° F. | | | | |
| 600 rpm | 37 | 53 | 112 | 232 |
| 300 | 25 | 42 | 95 | 198 |
| 200 | 22 | 37 | 82 | 180 |
| 100 | 19 | 29 | 64 | 158 |
| 6 | 13 | 17 | 44 | 88 |
| 3 | 8 | 11 | 38 | 67 |
| 10 s gel | 9 | 15 | 40 | 67 |
| 10 s min | 10 | 16 | 44 | 72 |

CONCLUSION

Novel silicate-based drilling fluid compositions have been achieved which afford improved lubrication between the drill string and well bore, through the addition of lubricant compounds selected from the group of tetra-(lower alkyl) ammonium hydroxide compounds.

Additionally, the inclusion of added hectorite clay to drilling fluids according to the present invention affords Theological stability at high-temperature, high-pressure drilling conditions. This is a surprising result, in that swelling clays such as Bentonite are known to lose viscosity in the presence of silicate. The tetra alkyl ammonium compounds used in lubricants in drilling fluids according to the present invention significantly reduce the "dispersion" effect of silicate on swelled hectorite, thus allowing for a much greater range of formulations of drilling fluid for use at all temperature and pressure conditions encountered in the working of an oil or gas well.

What is claimed is:

1. A water-based silicate fluid for drilling a well bore, comprising a viscosity-increasing material selected from the group consisting of hectorite clay, xanthan gum and polyanionic cellulose; from 5 to 50 volume percent of a liquid silicate; and from 0.1 to 15 volume percent of a liquid tetra ($C_1$–$C_4$ alkyl) ammonium hydroxide as a lubricity-enhancing agent.

2. A silicate drilling fluid as in claim 1 wherein said tetra ($C_1$–$C_4$ alkyl) ammonium hydroxide is tetramethyl ammonium hydroxide (TMAH) or tetrabutyl ammonium hydroxide (TBAH).

3. A silicate drilling fluid according to claim 2, wherein said silicate exhibits a molar ratio of $SiO_2$:$M_2O$ in the range of 1.5 to 4.0 where M is Na or K.

4. A silicate drilling fluid according to claim 1 or claim 2, wherein said viscosity-enhancing material is a hectorite clay, present in an amount of from 1 to 10 ppv of the drilling fluid composition.

5. A method of preparing a water-based silicate drilling fluid, comprising the steps of:
   (a) preparing a base fluid by adding a viscosity-enhancing xanthan gum or polyanionic cellulose with water and, when the viscosity of said aqueous mixture has stabilized, adding from 5 to 50 volume percent of a liquid silicate, in which the molar ratio of $SiO_2$:$M_2O$ in the range of 1.5 to 4.0 where M is Na or K; and
   (b) adding to said aqueous mixture a lubricant selected from the group of liquid tetra-($C_1$–$C_4$ alkyl) ammonium hydroxides in a proportion of from 0.1 to 15 percent by volume.

6. A method of preparing a water-based silicate drilling fluid, comprising the steps of:
   (a) preparing a base fluid by mixing a viscosity-increasing xanthan gum or polyanionic cellulose with water and allowing the mixture to stabilize; and
   (b) adding a pre-blended solution of a tetra-($C_1$–$C_4$ alkyl) ammonium hydroxide in an aqueous solution of a silicate exhibiting a molar ratio of $SiO_2$:$M_2O$ in the range of 1.5 to 4.0 where M is Na or K to produce a drilling fluid composition comprising 5 to 50 volume percent of silicate, and 0.1 to 15 volume percent of tetra-($C_1$–$C_4$ alkyl) ammonium hydroxide.

7. A method of preparing a water-based silicate drilling fluid, comprising the steps of:
   (a) preparing a base fluid by mixing the hectorite clay with water and allowing the mixture to stabilize; and
   (b) adding to said aqueous mixture a lubricant selected from the group of liquid tetra-($C_1$–$C_4$ alkyl) ammonium hydroxides in a proportion of from 0.1 to 15 percent by volume.

8. A method of preparing a water-based silicate drilling fluid, comprising the steps of:
   (a) preparing a base fluid by mixing a hectorite clay with water and allowing the mixture to stabilize; and
   (b) adding a pre-blended solution of a tetra-($C_1$–$C_4$ alkyl) ammonium hydroxide in an aqueous solution of a silicate exhibiting a molar ratio of $SiO_2$:$M_2O$ in the range of 1.5 to 4.0 where M is Na or K to produce a drilling fluid composition comprising 5 to 50 volume percent of silicate, and 0.1 to 15 volume percent of tetra-($C_1$–$C_4$ alkyl) ammonium hydroxide.

* * * * *